United States Patent
O'Grady et al.

[19]

[11] Patent Number: 5,947,007
[45] Date of Patent: Sep. 7, 1999

[54] FIREBOX FOR VERTICAL HEARTH BARBECUE GRILL

[75] Inventors: Richard M. O'Grady, Soughtington; Glen Nielsen, Kent; William D. Hester, Newinton, all of Conn.; Alphonso G. Andress, Malecon Balta 720, Lima, Peru

[73] Assignee: Alphonso G. Andress, Lima, Peru

[21] Appl. No.: 09/223,789

[22] Filed: Dec. 31, 1998

[51] Int. Cl.⁶ .................................. A47J 37/00; F24B 3/00
[52] U.S. Cl. ........................ 99/340; 99/355; 99/421 H; 99/447; 99/449; 99/450; 99/482; 126/25 R; 126/9 R
[58] Field of Search ............................. 99/339, 340, 352, 99/355, 400, 401, 419–421 V, 444–450, 481, 482; 126/25 R, 9 R, 41 R, 25 AA; 426/523

[56] References Cited

U.S. PATENT DOCUMENTS

| | | | |
|---|---|---|---|
| 3,175,549 | 3/1965 | Bergsten | 126/25 R |
| 3,550,525 | 12/1970 | Rabello | 99/446 X |
| 3,611,912 | 10/1971 | Choc | 99/340 X |
| 3,783,855 | 1/1974 | Newinger | 126/25 R |
| 3,999,472 | 12/1976 | Einto | 99/340 |
| 4,120,237 | 10/1978 | Mecherlen | 99/340 |
| 4,338,912 | 7/1982 | Gaskins | 126/25 R |
| 4,442,824 | 4/1984 | Amici | 126/9 R |
| 4,730,597 | 3/1988 | Hottenroth et al. | 126/41 R |
| 5,333,540 | 8/1994 | Mazzocchi | 99/421 V |
| 5,431,093 | 7/1995 | Dodgen | 99/427 X |
| 5,499,574 | 3/1996 | Esposito | 99/339 |
| 5,536,518 | 7/1996 | Rummel | 426/523 |

*Primary Examiner*—Timothy F. Simone
*Attorney, Agent, or Firm*—Kile McIntyre & Harbin

[57] ABSTRACT

A removable firebox for use in a portable, collapsible barbecue grill including retractable heating grate on top of the firebox and a retractable mid-level cooking grill for providing high-temperature cooking. A lower main grill is disposed in a base cavity of the barbecue grill for providing moderate temperature cooking. The firebox rests in the base cavity of the grill housing and provides heat to a cooking area defined by the base cavity, an upper lid of the housing and a pair of side walls extending upward from the base cavity. The firebox and/or the upper lid includes insulation and/or cooling baffles to protect users from heated surfaces. Venting is provided from the sides and rear of the grill housing. When collapsed, the grate and grills fold onto or are retracted within the firebox, and the entire firebox assembly is stowed in a sealed grill housing. The top and bottom portions of the grill housing mate to form a sealed container-like structure for convenient transportability or storage. The barbecue grill also includes foldable legs that lock into extended position when deployed.

41 Claims, 14 Drawing Sheets

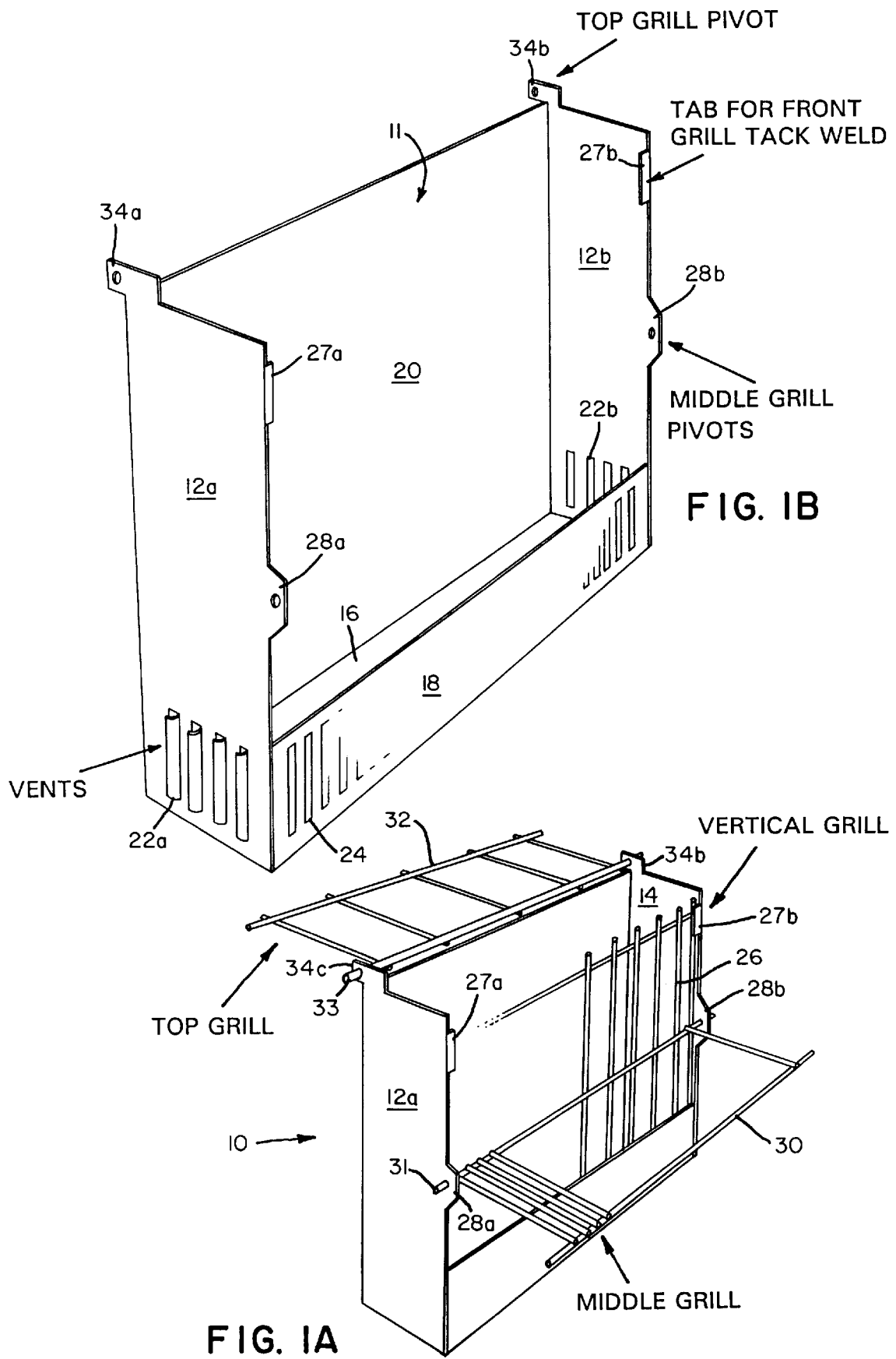

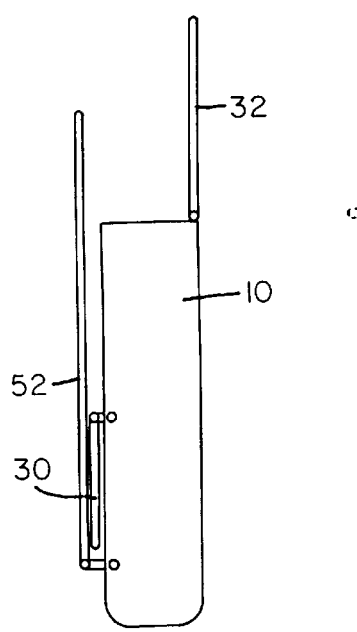
FIG. ID
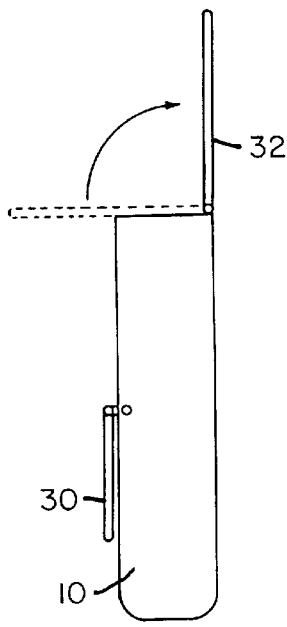
FIG. IE
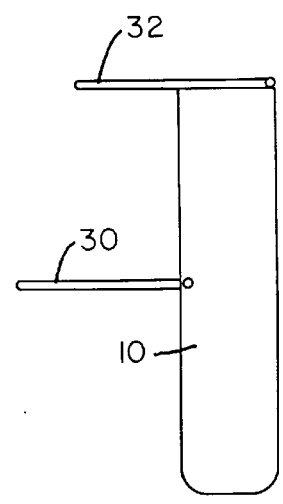
FIG. IF
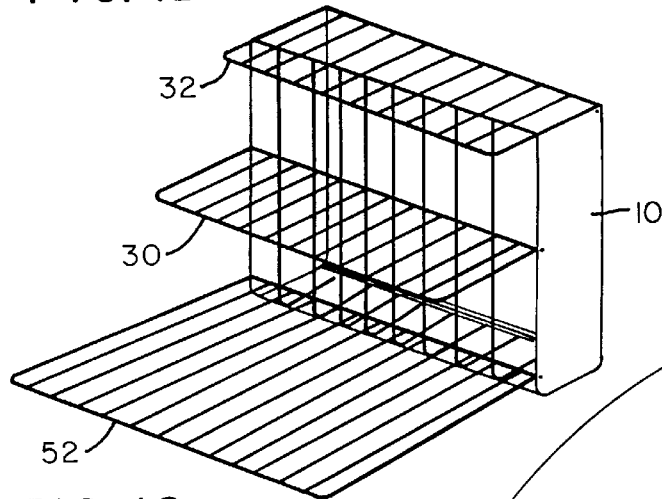
FIG. IG
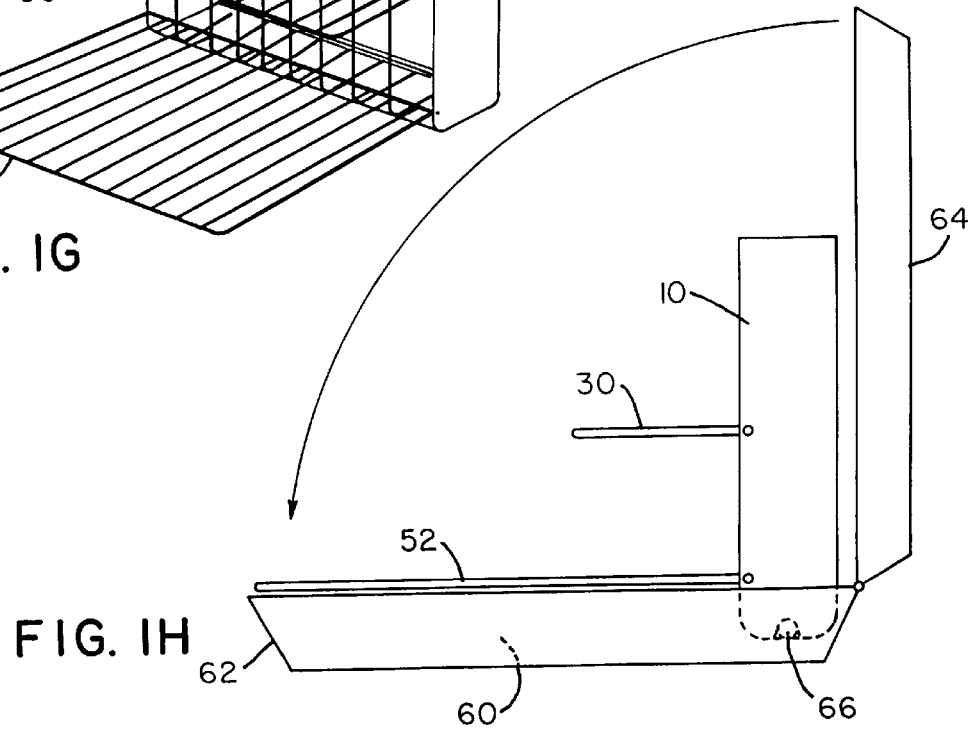
FIG. IH

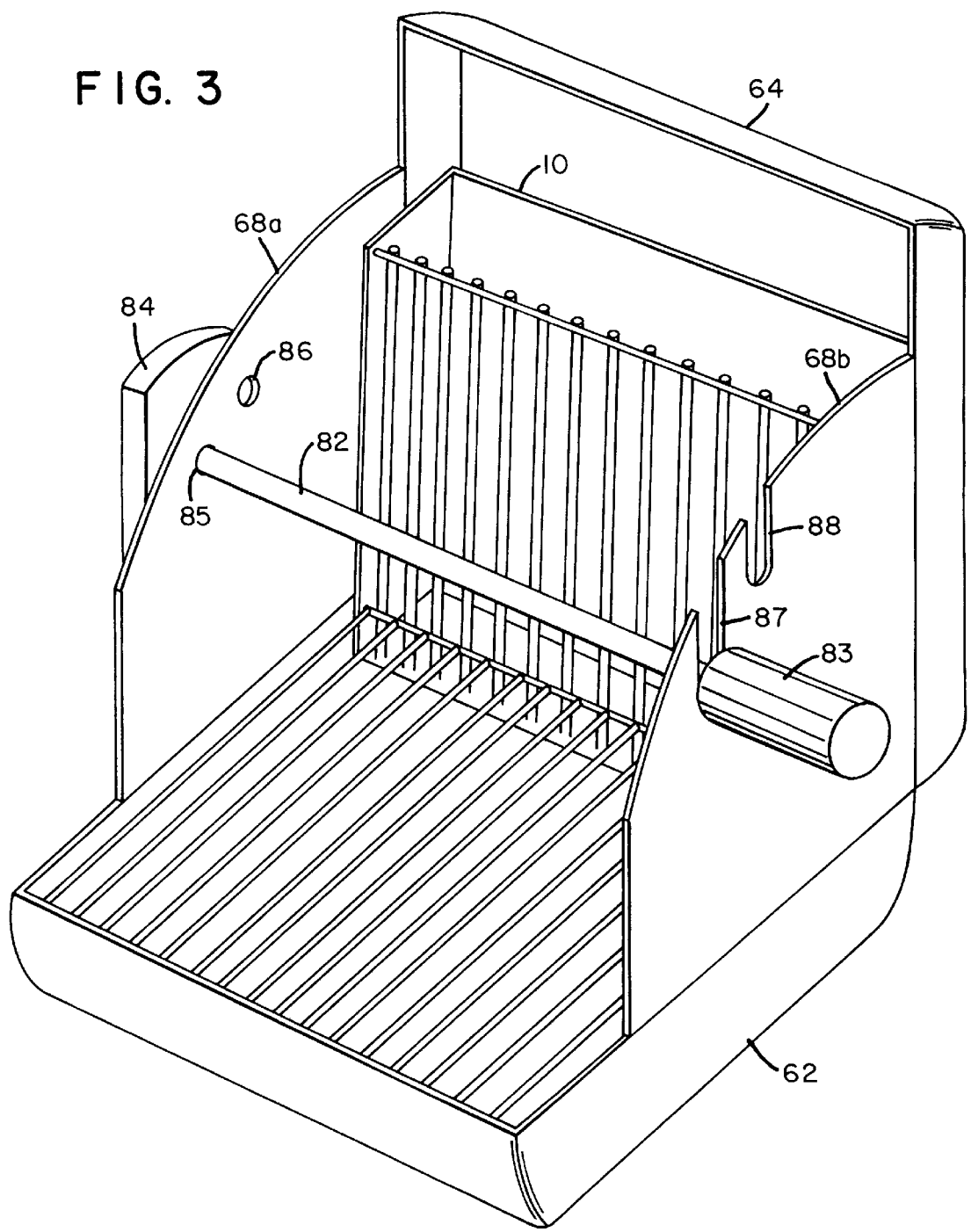

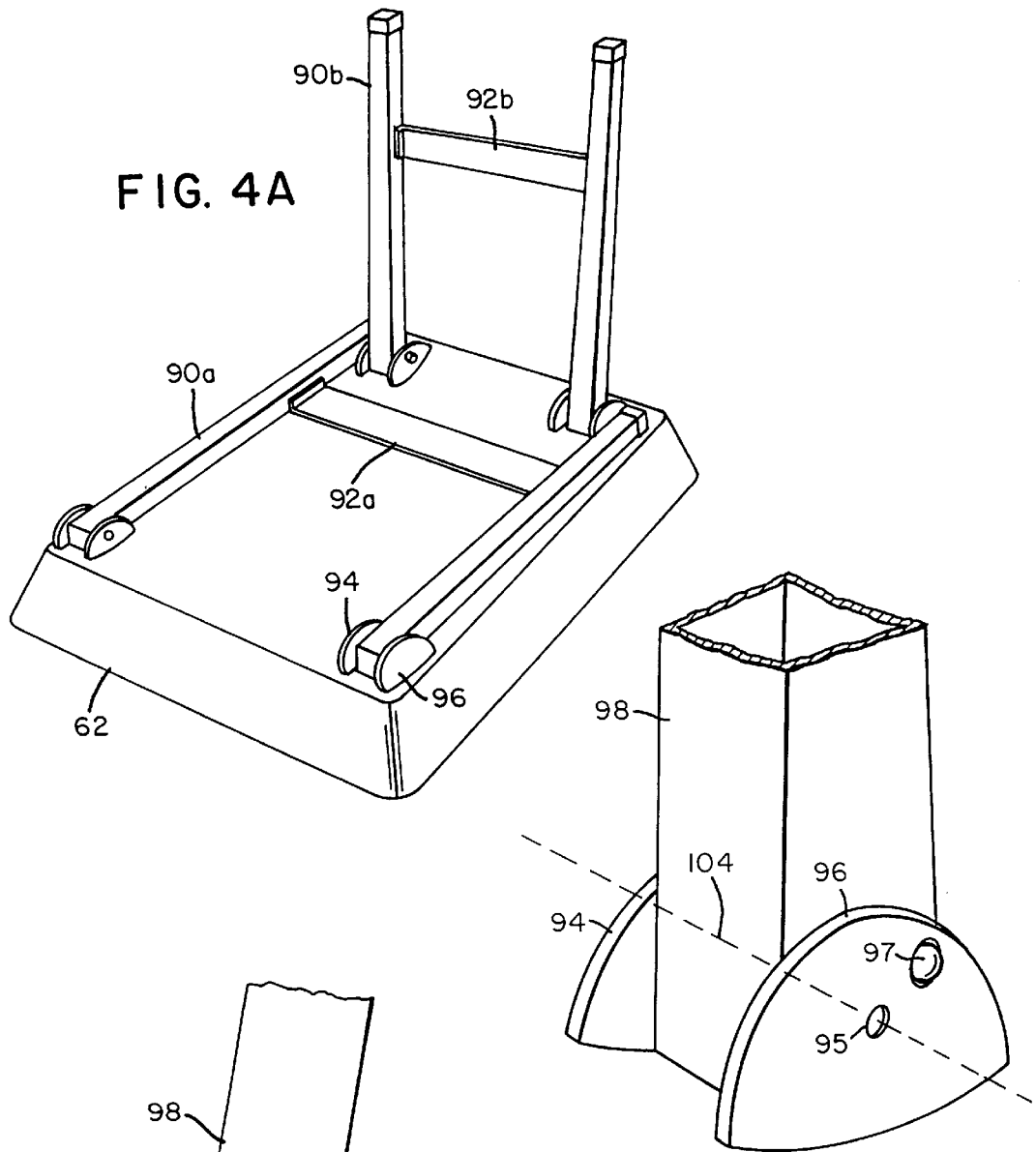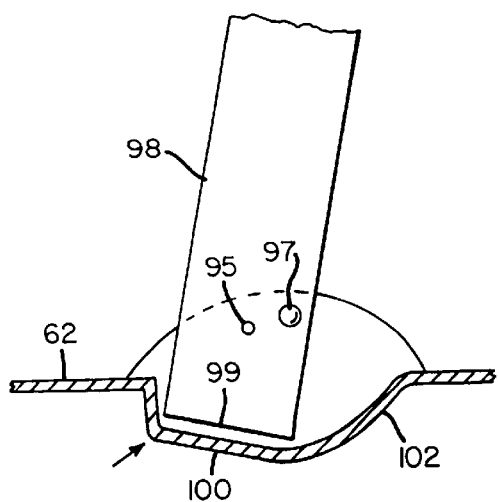

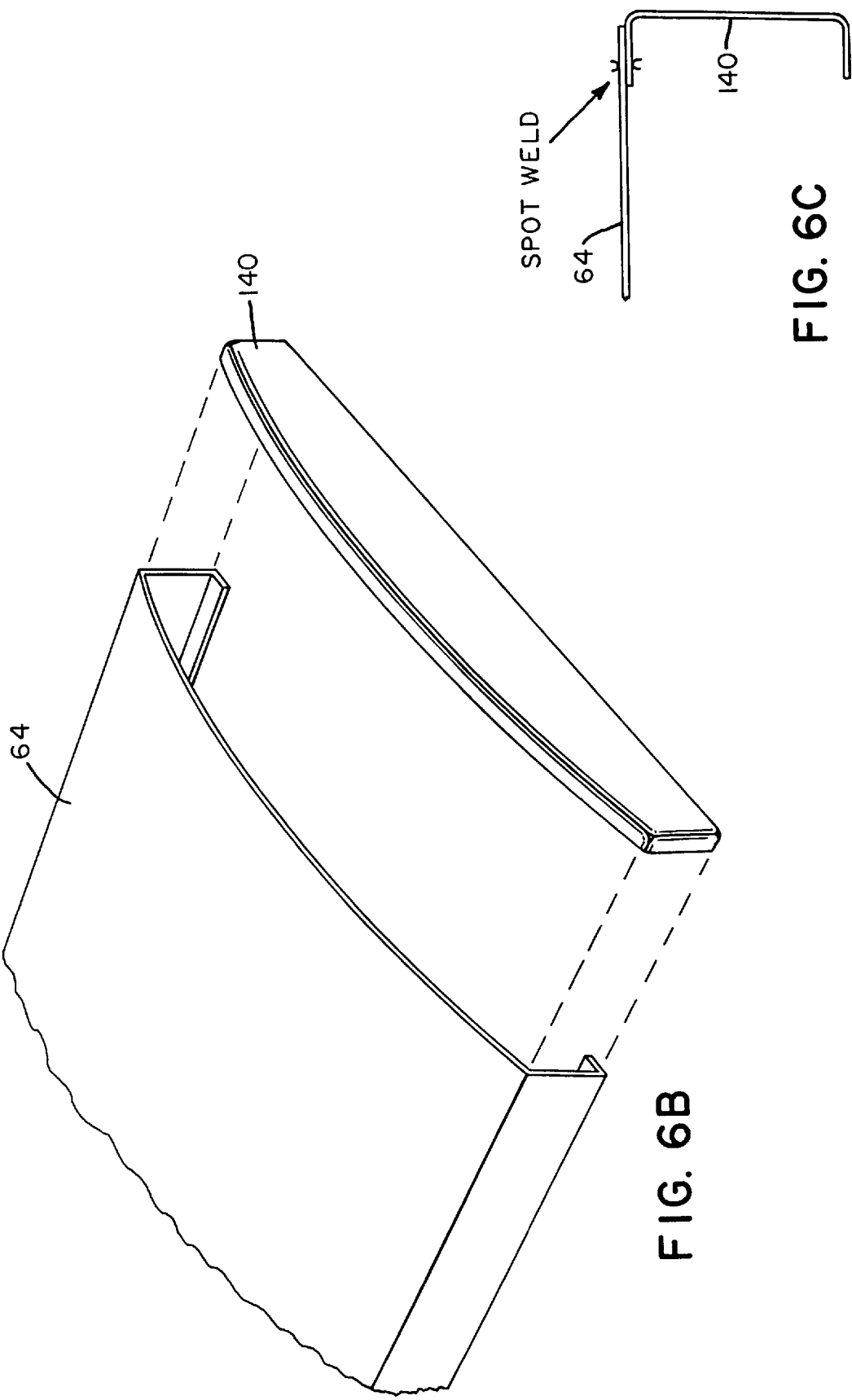

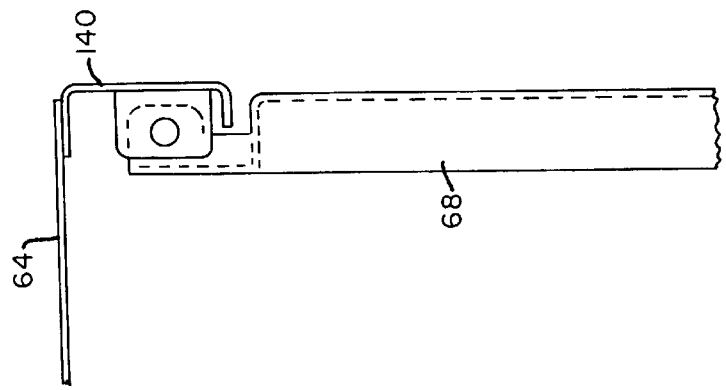
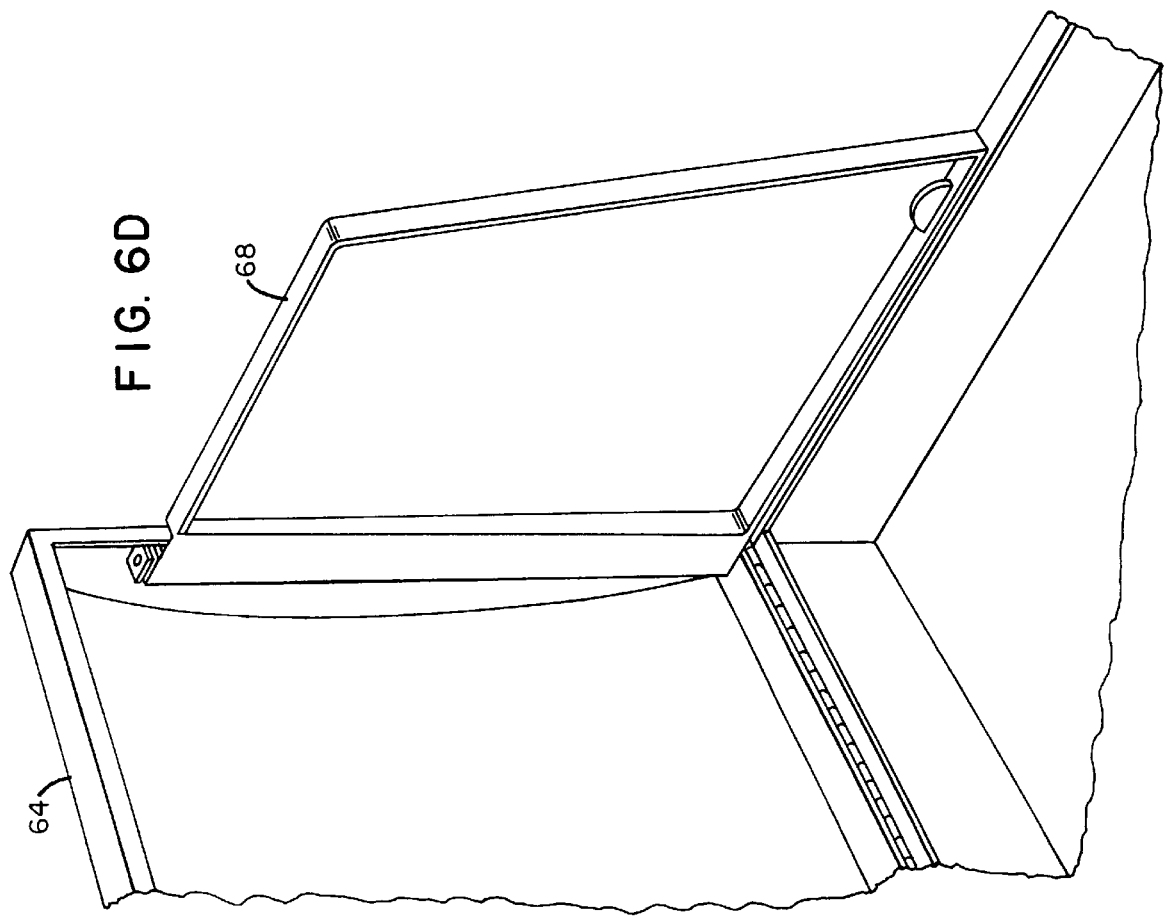

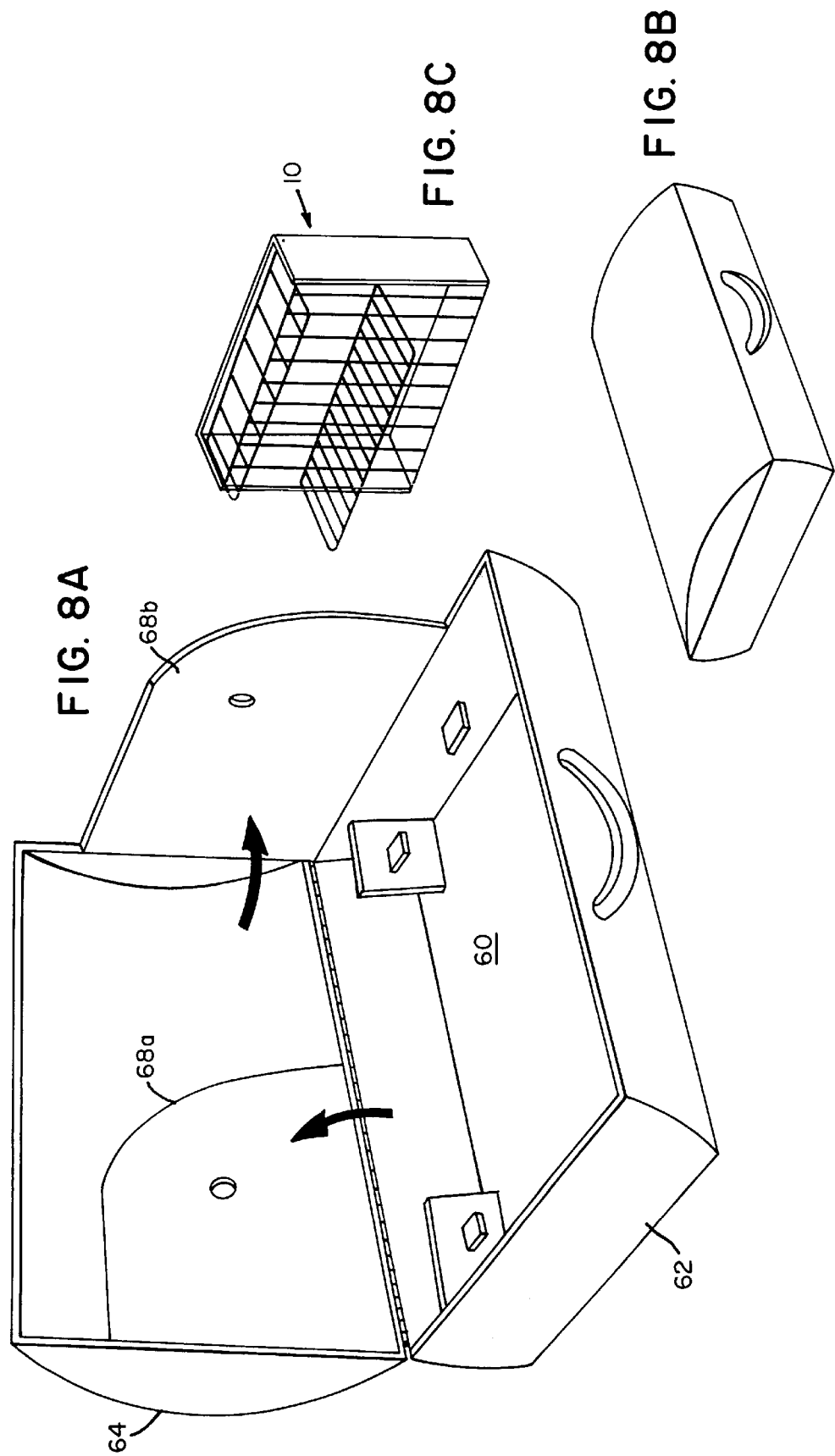

FIREBOX FOR VERTICAL HEARTH BARBECUE GRILL

BACKGROUND OF THE INVENTION

Outdoor cooking and barbecuing have become significant activities, but traditional barbecue grills have remained unchanged for quite a while. However, grills with vertical hearths have been known in the art for some time. See, for example, U.S. Pat. Nos. 3,999,472 to Einto, 3,783,855 to Newinger, 3,611,912 to Choc, 3,550,525 to Rabello, 3,175,549 to Bergsten, as well as that art mentioned in commonly-owned related U.S. Pat. No. 5,823,174 to Andress. It is believed that vertical grills have not been significantly utilized because prior models lacked convenience, practicality and efficiency.

For example, the vertical grill disclosed by commonly-owned U.S. Pat. No. 5,823,174 advantageously provided a vertical hearth that extended below a main cooking grill whereby convective and radiant heat from a heat source covered a relatively larger cooking area. Coupled with sidewalls, this grill design increased the amount of main grilling surface that was usable for grilling, roasting or baking. Also, prior vertical grills neither provided multiple cooking temperatures at plural cooking levels nor did they provide kettle rack in combination with other grilling surfaces. In addition, prior grills did not provide deployable or extendable grate or grill members that facilitated portability and stowing. Rotisserie rods were used in the past, but not in combination with multiple multi-temperature grilling surfaces. Also lacking in prior models was a removable firebox that accommodated these features. The present invention, however, overcomes many of these as well as other drawbacks and disadvantages.

It is therefore an objective of the present invention to provide a rapidly deployable, portable and/or stationary barbecue grill having a removable firebox that co-acts with a cooking chamber to provide multi-temperature cooking.

It is another objective of the present invention to allow such rapid deployment by providing collapsible barbecue grill components, such as folding legs and fold-out side walls, and at least one deployable cooking grid pivotally attached to a firebox.

It is another objective of the present invention to provide a firebox construction that supports at least one deployable and retractable heating grate and/or cooking grill.

It is a further objective of the present invention to provide a firebox-barbecue grill combination where the two, when deployed, act together to create multiple heating surfaces at multiple cooking temperatures to permit simultaneous cooking of varied food items.

It is yet another objective of the present invention to provide a firebox-barbecue grill housing combination wherein, upon deployment, airflow is provided at the rear and/or lower portions of the firebox thereby minimizing cooler air draft within or about the cooking chamber.

It is yet a further objective of the present invention to provide radiant-reflective surfaces in and/or about the firebox receptacle thereby confining and directing heat to a main cooking chamber of the barbecue grill.

It is yet a further objective of the present invention to provide a barbecue grill that supports rotisserie rod, including manual, mechanical or electro-mechanical drive means for the rotisserie rod.

It is another objective of the present invention to provide a firebox-barbecue grill housing construction that permits efficient cooling of housing parts.

It is another objective of the present invention to provide a barbecue grill with a large amount of grilling surface without substantially increasing the overall weight of the barbecue grill.

It is yet another objective of the present invention to provide sufficient heat beneath a main cooking grill thereby increasing the available cooking area of the main cooking grill.

It is also an objective of the present invention to provide a fixed, deployed barbecue grill having the above-specified objectives, wherein various components thereof (legs, grates, firebox, grills, sidewalls, etc.) may be secured or fastened in a fixed position rather than being retracted.

It is another objective of the present invention to provide a barbecue grill construction that is conveniently manufactured, either using sheet metal or aluminum casted housing parts.

It is a further objection of the present invention to provide a durable anti-warping firebox construction that resists warping when heated.

It is yet a further objective of the present invention to provide a firebox-grill housing combination that facilitates cooling and heat shielding of grill housing parts during fuel oxidation by providing insulation within and/or upon said grill housing and/or providing cooling baffles upon said firebox and/or grill housing.

SUMMARY OF THE INVENTION

In accordance with the invention, a firebox having at least one deployable cooking grill provides heat to a cooking area generally defined by a base cavity and extended side walls of the barbecue grill is provided with a fixed or collapsible barbecue grill. The firebox generally comprises a vertically disposed enclosure having an open top, a bottom confine, opposed front and rear confines, and opposed side confines for restricting a source of fuel within boundaries. The front confine, which may comprise a grate, wire mesh, or expanded metal, permits radiation of heat from a fuel source, e.g., charcoal briquettes, wood chips, lava rocks. The firebox also includes supports for supporting a mid-level cooking grill in a substantially horizontal position between the top and bottom of said firebox. In a refinement of the invention, the firebox includes a pivoting mid-level cooking grill for high-temperature cooking and a deployable kettle rack directly over the burning fuel for heating a pot or kettle.

In another aspect of the invention, the firebox, with or without a deployable grate or grill, forms the vertical hearth of a barbecue grill and is storable in the base cavity when not in use. When fully deployed, however, the firebox stands upright in spaced relation to a rear housing wall or lid thereby facilitating cooling of (or reducing heat transfer to) the outer grill housing.

These and other multiple objectives, advantages, and aspects of the invention will become more readily apparent in view of the description of illustrative embodiments and the accompanying drawings. The invention, though, is pointed out with particularity by the appended claims.

BRIEF DESCRIPTION OF THE DRAWINGS

FIG. 1A is a perspective view of a removable firebox having deployable grills according to one aspect of the present invention.

FIG. 1B is also a perspective view of the embodiment of FIG. 1A without deployable grills.

FIG. 1D, 1E, 1F, 1G, and 1H are conceptual illustrations of a firebox according to various other aspects of the present invention.

FIG. 3 depicts an exemplary supporting structure for a rotisserie rod between side walls of a barbecue grill constructed according to an aspect of the present invention.

FIG. 4A shows folding legs together with supporting structure on the underside of the lower portion of the barbecue grill housing according to an aspect of the present invention.

FIG. 4B illustrates further details of the supporting structure of FIG. 4A.

FIG. 4C depicts yet further details of the supporting structure of FIG. 4B.

FIG. 6B shows construction details of the upper housing for a barbecue grill according to a sheet metal construction.

FIG. 6C illustrates attachment details of the structure of FIG. 6B.

FIGS. 6D and 6E illustrate rotational attachment between a side wall and the upper housing of a barbecue grill according to one aspect of the present invention.

FIGS. 8A and 8B are conceptual drawings of a collapsible barbecue grill according to yet another aspect of the invention.

FIG. 8C is a conceptual drawing of a removable firebox for the barbecue grill of FIGS. 8A and 8B.

DESCRIPTION Of ILLUSTRATIVE EMBODIMENTS

Figure 1C:
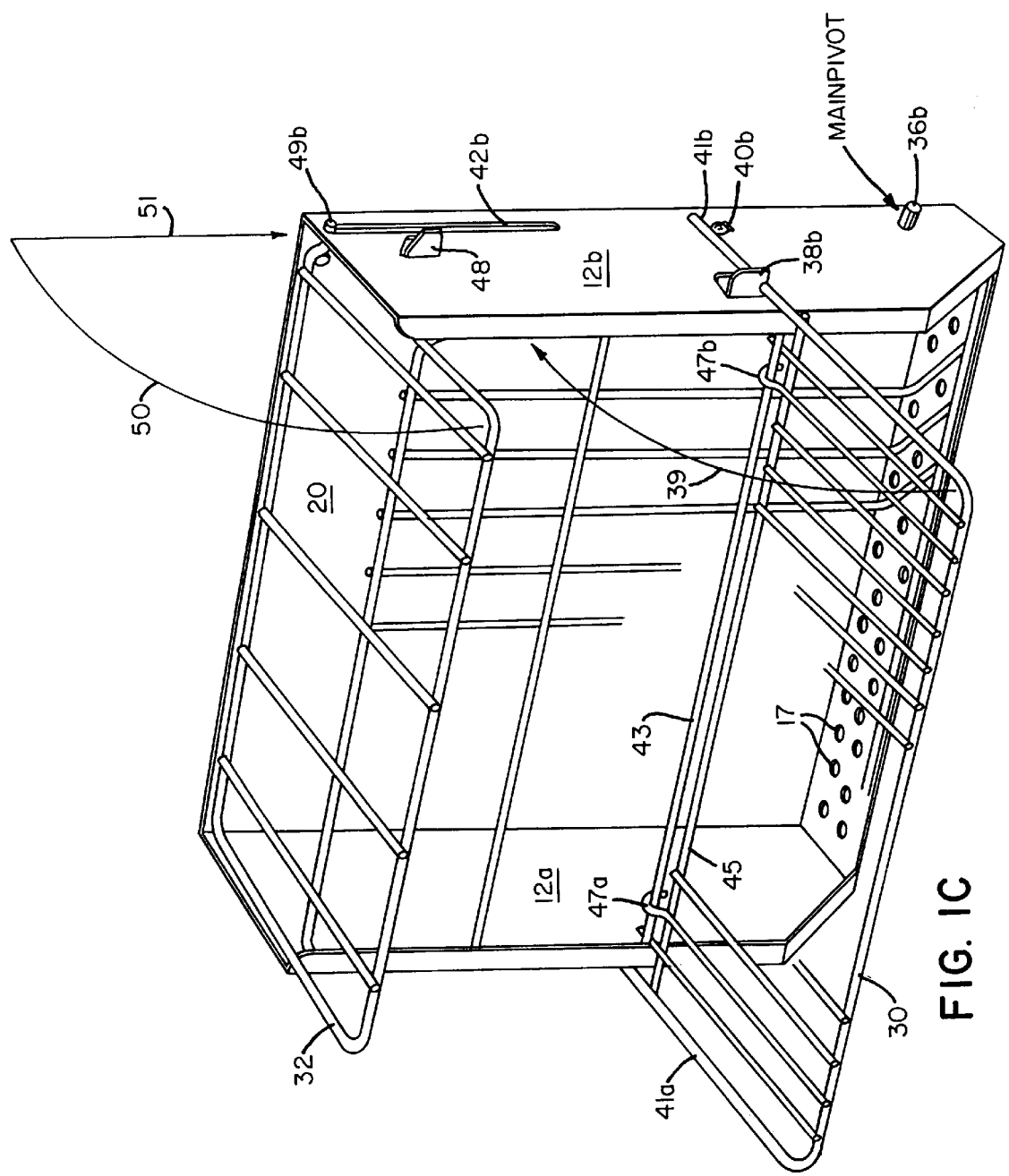
FIG. 1C is a perspective view of another embodiment of a removable firebox according to another aspect of the present invention.

As indicated above, objectives of the invention include providing a firebox separate and apart from a barbecue grill whereby to provide, among other things, convenient cleanup after use, protection of barbecue grill housing from extreme heat, self-contained storage of grill components, transportability, collapsibility and rapid deployment of barbecue grill and grill components. These objectives are provided, in part, by, for example, a removable firebox 10 illustrated in FIGS. 1A and 1B. In the illustrated embodiments, the firebox 10 provides a vertical hearth for a barbecue grill and comprises a generally vertical enclosure having an open top 11 and confines for holding fuel such as charcoal, briquettes, wood chips and the like. A source of fuel may also include a source of gas, a gas burner, and lava rocks within the firebox. The firebox 10 has at least one planar surface in front and is generally shown to have a rectangular cross-sectional structure, but in practice, may take on a variety of forms or shapes. As illustrated in FIGS. 1A and 1B, however, the confines include side walls 12a and 12b, a rear wall 20, the bottom confine 16, and a front confine comprising a grill 26. Although illustrated in sheet metal construction, the firebox may also include a steel or cast iron frame in order to provide strength to prevent warping of the firebox when exposed to the extreme heat of burning fuel. Stiffening ribs may be stamped into the sheet metal in order to improve warping resistance to heat. Alternatively, portions of or all surfaces of the firebox may be constructed of a wire mesh, expanded metal, steel rods, or other materials.

The bottom portion of the firebox 10 includes a raised flange 18 having a plurality of air vents 24, which assist in maintaining an air draft that supplies the fuel during oxidation thereof. Additional groups of vents 22a and 22b are provided in the bottom portion of the sides 12a and 12b of the firebox. The firebox 10 also includes a pair of tabs 28a and 28b for providing pivot points for a rod 31 of a mid-level 30, a pair of flanges 27a and 27b for supporting a grate grill as a front confine of the firebox, and a pair of protruding flanges 34a and 34b, which provide pivot points for rod 33 of kettle rack 32, i.e., a heating grate, for supporting a kettle or pot directly above burning fuel. In a deployed position, the mid-level grill 30 may be supported in a horizontal position by anchors (not shown) located on side walls of the grill housing, or alternatively, by a stop mechanism that interacts with the mid-level grill 30 and any portion of the firebox 10, such as side walls 12. The heating grate 32, when folded over onto the top of the firebox 10, may rest directly on top of the front grill 26 or on any other portion of the firebox in order to sustain the heating grate 32 in a horizontal position.

Firebox 10 may also include cooling baffles on the sides and/or rear confines thereof in order to reduce heat transfer to the outer casing of the grill housing. Such baffles may take on a variety of constructions, from single to multi-layer sheet metal. Insulating material may also be employed to reduce heat transfer, and air flow may also be induced in the rear portion of the grill housing to facilitate cooling. Such flow may be provided by vents within and/or spacing between parts of the barbecue housing, as shown, for example, in FIG. 6A and 7A. When positioned in the base cavity of the grill housing, firebox 10 is displaced from the rear casing by at least a couple to a few centimeters in order to reduce heat transfer to the grill housing.

FIG. 1C depicts one of many alternative embodiments of a firebox. Here, firebox 10 provides a horizontal supporting mechanism for both the mid-level grill 30 and the heating grate 32. In addition, the firebox includes a mechanism for fully retracting both the mid-level grill 30 and the heating grate 32. The front of the firebox, at the lower portion, has a beveled cross-sectional shape which provides obstruction clearance during rotational movement of the firebox towards the base cavity of the barbecue grill. In particular, studs 36a (not shown) and 36b co-act with pivot supports in the base cavity of the barbecue grill so that the firebox may be folded downwardly into the base cavity. When so folded, cooking grill 30 retracts to a position parallel to the front of the firebox and heating grate 32 folds upward and then retracts downwardly into the firebox.

A deployment and retraction mechanism for the mid-level grill 30 includes extension arms 41a and 41b of mid-level grill 30, which co-act with flanges 38a 38b located on side walls 12a and 12b of the firebox and with friction studs 40a and 40b, which lock the mid-level grill 30 in a horizontal position upon rotation along path 39. A rod 43 of the front confine of the firebox, extending horizontally along the front of the firebox, provides an axis of rotation for mid-level grill 30. Grill 30 includes extended members 47a and 47b for grasping and/or encircling the support rod 43. Preferably, grill 30 comprises stainless-steel, porcelain coated steel or other material for providing easy cleaning and a nonstick surface.

Although termed a mid-level grill, its horizontal position may lie at any vertical position between the top and bottom of the firebox 10, depending upon the required heat application. A higher placement provides greater heat. To meet certain other objectives of the invention, the mid-level grill should be sufficiently high enough from the bottom of the firebox to permit higher temperature cooking than that provided by a main cooking grill, which extends horizontally and perpendicular along a lower portion of the firebox. Also, it is important that at least a portion of the firebox extends below the main cooking grill in order to permit sufficient radiation and convection of heat from the fuel source into a heating area or chamber generally defined in a base cavity of the barbecue grill. These components are subsequently described in conjunction with the description of the combination of the firebox and the barbecue grill.

Still referring to FIG. 1C, the heating grate 32 may also be retracted when rotated upwardly generally along path 50, and then displaced downwardly along path 51 when guided by slot pairs 42a (not shown) and 42b disposed in side walls of the firebox. Heating grate 32 includes protruding studs 49a (not shown) and 49b that guide the rotational and displacement motion of the heating grate 32 during retraction and deployment. The width of heating grate 32 is slightly smaller than the inside width of the firebox 10 in order to permit storage of the grate 32 inside firebox 10. Heating grate 32 may be constructed of steel, iron, or may even comprise a solid heating plate or other support structure for a pot or kettle.

FIGS. 1D, 1E, 1F, 1G, and 1H show various extension/retraction configurations of firebox grates and grills. FIG. 1D, for example, depicts a firebox 10 having a retractable heating grate 32, a retracted mid-level grill 30 and a retracted main grill 52, each being pivotally attached and supported by the firebox. FIG. 1E shows a firebox having a retractable heating grate 32 and a retracted mid-level grill 30. FIG. 1F depicts the firebox of FIG. 1E when the heating grate 32 and the mid-level grill 30 are in a deployed, extended position. FIG. 1G is a conceptual perspective diagram of a firebox 10 having deployed heating grate 32, mid-level grill 30, and main grill 52. FIG. 1H shows the firebox in relation to a barbecue grill having a lower portion 62 and upper portion 64. The firebox rests on pivot supports 66 located within the base cavity 60 of the barbecue grill. Support 66 helps to maintain the firebox 10 in a vertical position so that the mid-level grill 30 and main grill 52 may rest in horizontal positions. The barbecue grill of FIG. 1H is collapsible in the sense that the top portion 64 may fold over and mate with the lower portion 62 to provide a sealed container, which prevents ashes, fuel, cooking residue and the like from spilling when stowed or transported. The lower portion 62 of the barbecue grill provides a cradle for the collapsed firebox 10 with retracted grill members 52, 30 and 32.

Figure 2D:
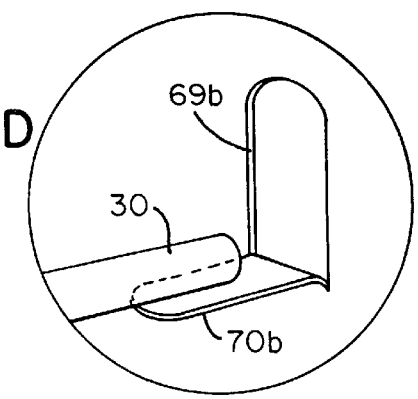
FIG. 2D depicts a support flange for sustaining a mid-level grill in a horizontal position according to an aspect of the present invention.
Figure 2A:
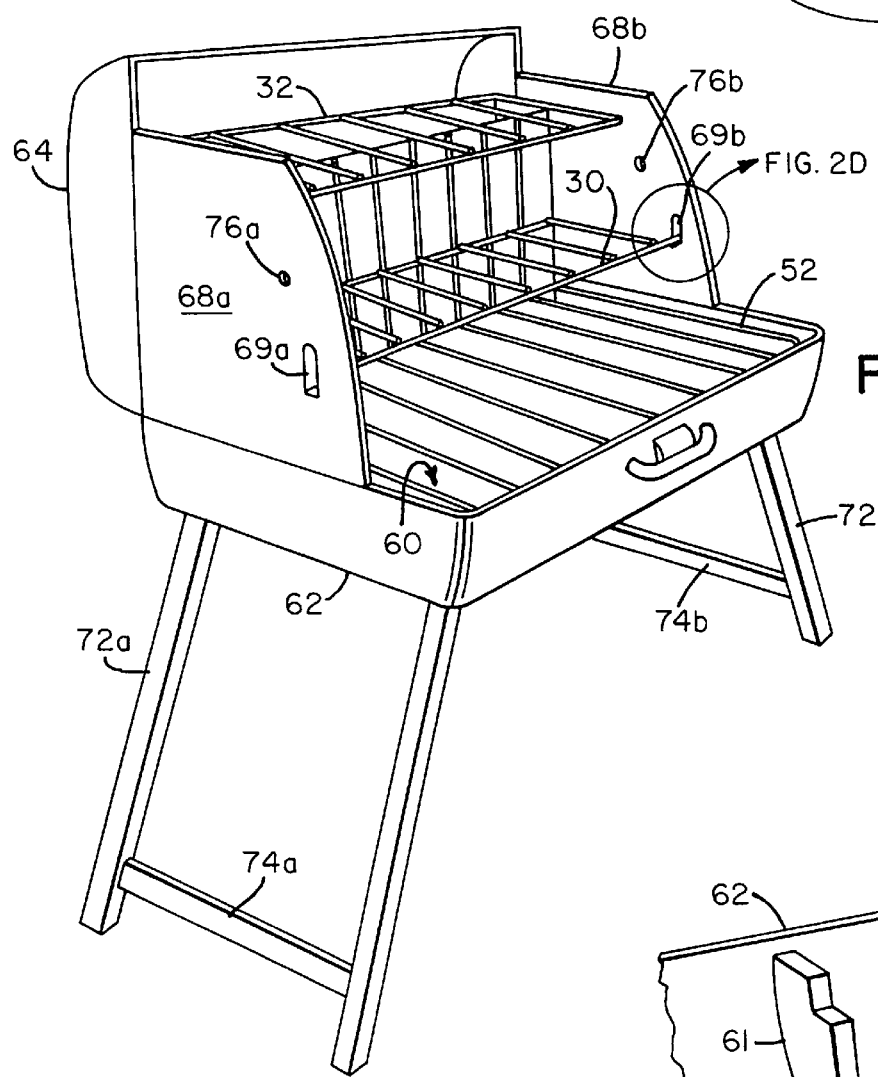
FIG. 2A is a perspective view of a fully deployed barbecue grill including a vertical hearth in accordance with an aspect of the present invention.
Figure 2B:
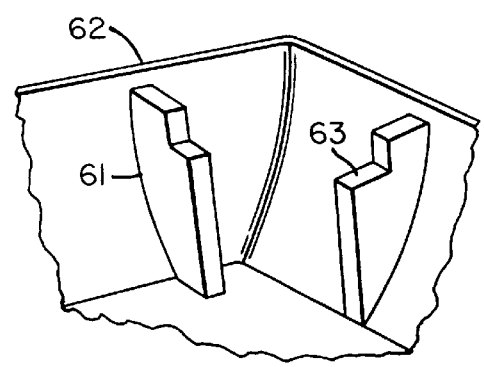
FIG. 2B depicts support flanges for a main grill within the base cavity of the barbecue grill.

FIG. 2A is a perspective view of a barbecue grill utilizing a firebox 10 as a vertical hearth. The collapsible barbecue grill shown in the illustration includes a lower portion 62 having a base cavity 60, an upper portion 64 that is adapted to pivot on hinges to mate with lower portion 62, side walls 68a and 68b that may be either hinged to the upper portion 64 or hinged to the lower portion 62 and adapted to be folded outward or upward, as the case may be, to define a heating area therebetween. Instead of hinging, these components may be releasably fastened together. In a stationary grill, these parts may be welded. Side walls 68a and 68b also include punchouts 69a and 69b, which provide tabs 70a (not shown) and 70b (FIG. 2B) for supporting mid-level grill 30 in a horizontal position. Side walls 68a and 68b also include rotisserie rod supports 76a and 76b for accepting a rotisserie rod and/or rod turning mechanism. The rotisserie rod and turning mechanism may be a standard off-the-shelf item, such as that available from Char-Broil (W.C. Bradley Co.) or other barbecue parts supplier. The base cavity 60 of the lower portion 62 of the barbecue grill include flanges 61 and 63 (FIG. 2B) for supporting the main grill 52. The base portion 62 of the barbecue grill assembly also includes foldable leg pairs 72a and 72b, each including respective cross-member braces 74a and 74b.

Figure 2C:
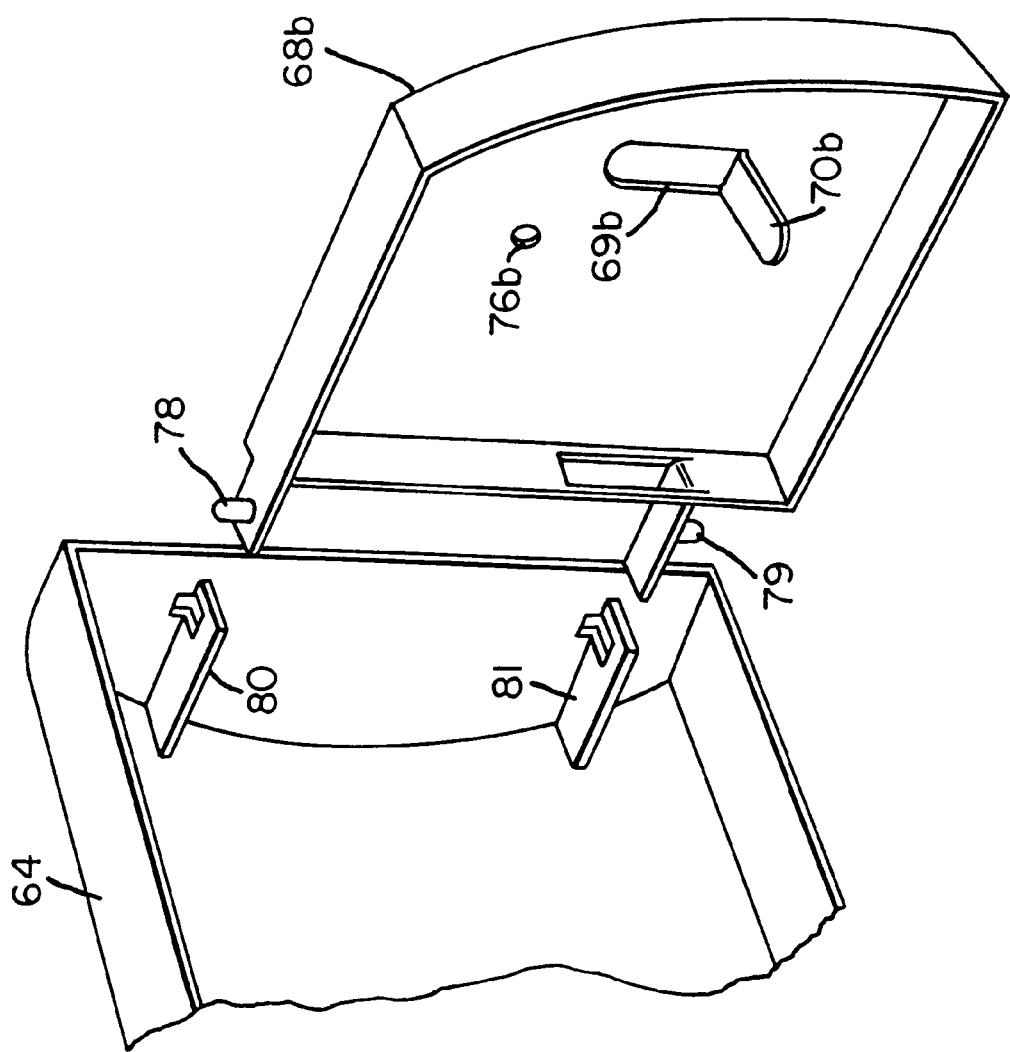
FIG. 2C shows a pivoting support structure for side walls attached to the upper portion of a barbecue grill housing.

FIG. 2C illustrates a possible hinging mechanism between side wall 68b and an upper portion 64 of a barbecue grill. As shown, the side wall 68b includes studs 78 and 79 located on protruding flanges that mate with protruding flanges 80 and 81 of the upper housing lid 64 of the barbecue grill in order to provide a pivot support mechanism.

The barbecue grill may also include insulation material in various parts thereof to protect users from extreme heat generated by oxidizing fuel in the firebox 10. Insulation may comprise a double-wall construction of lid 64 including insulating spacers, e.g., ceramic, between inner and outer walls thereof. The double-wall structure may include insulating material, such as high-temperature fiberglass or other non-combustible material. Thermal insulating material may also be place on the outside surface of lid 64 to minimize or prevent touching hot metal parts wherein the inside wall is even thermally insulated along the periphery of the double wall seal. Sidewalls 68a and 68b may also be coated with insulating material. Cooling baffles may be placed on the rear portion of the firebox 10 or on the inside surface of lid 64 to further reduce heat transfer to the outer housing.

FIG. 3 shows a relationship between a rotisserie rod 82 and side walls 68a and 68b of the barbecue grill. Rotisserie rod 82 extends through a pair of supports 85 and 87, each of which is positioned generally equidistant from a generally (but not necessarily) planar surface of the firebox. Rotisserie rod 82 also may be repositioned to a location closer to the firebox simply by utilizing support pairs 86 and 88. Side walls 68a and 68b may have additional sets or pairs of rotisserie rod supports. Also, a driving mechanism 84 may be attached to either side wall in order to rotate the rotisserie rod. The driving mechanism may be an electrically operated motor or a coil spring motor providing constant force or other rotation; or the rod may be manually turned during cooking. A conventional constant force coil spring motor is available from Ming Tai Industrial Co., Ltd. of Taiwan, and such a driving mechanism would include gearing, ratcheting, locking/release mechanism and spindles in a conventional way, as known in the art. To assist in circumferentially positioning a manually operated rotisserie rod, slot 87 may co-act with a generally polygon cross-sectional rotisserie rod, i.e., square, hexagonal, etc., to provide circumferential positioning when rod is lifted, rotated and re-inserted into slot 87.

FIG. 4A shows further details of folding leg pairs 90a and 90b on the bottom portion 62 of the barbecue grill. Each leg pair includes a flat cross member brace 92a and 92b, which is located on complementary inner and outer sides of the folding legs so that the leg pairs retract substantially into the same plane. FIG. 4B shows a hinging and locking mechanism for each of the folded legs. Flanges 94 and 96 support an axial pin (not shown) over which leg 98 rotates. At least one of the flange portions 96 includes a locking mechanism 97 to lock the legs in an extended position when the grill is deployed. These flanges 94 and 96 may be cast directly in the body of the grill to save labor cost during manufacturing or may comprise sheet metal flanges that are spot welded to the base 62 of the barbecue grill. Other attachment means may also be employed. FIG. 4C depicts the geometric configuration of an inset for supporting leg 98 in an extended position. In particular, a top surface 99 of leg 98 mates with a flat portion 100 that is recessed within the bottom portion 62 of the barbecue grill housing. A curved portion 102 of the recess provides clearing for rotation of leg 98 about an axis 104 (FIG. 4B) to a retracted position.

Figure 5:
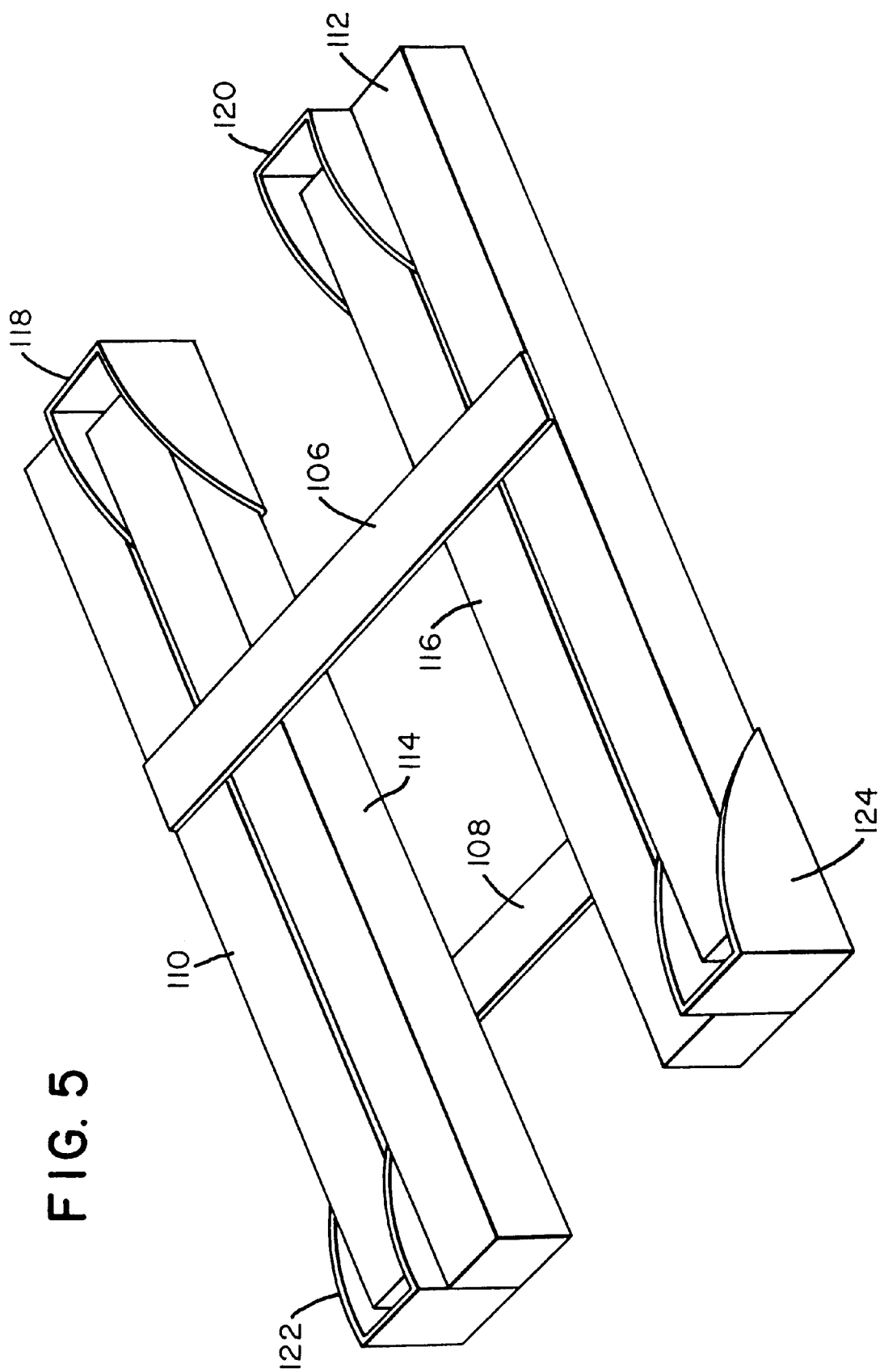
FIG. 5 shows folding legs of the barbecue grill in a retracted position.

FIG. 5 shows a sheet metal construction for the retractable leg assembly. An inner leg pair 114 and 116 are attached to the base portion of the barbecue grill via flange assemblies 118 and 120, and are tied together by a flat flange 108. Flange assembly 118 and 120 provide pivoting support and a locking mechanism for the leg pair when moved from a retracted to a deployed position. An outer leg pair 110 and 112 are also supported by flange assembly 122 and 124, and are tied together by a flat flange member 106. This construction provides retraction of all legs 110, 112, 114, and 116 into substantially the same plane. Rather than having inner and outer leg pairs, the legs in each pair may be staggered over one another so that one leg lies in the inner position and the other leg lies in the outer position relative to the periphery of the base portion 62 of the barbecue grill.

Figure 6A:
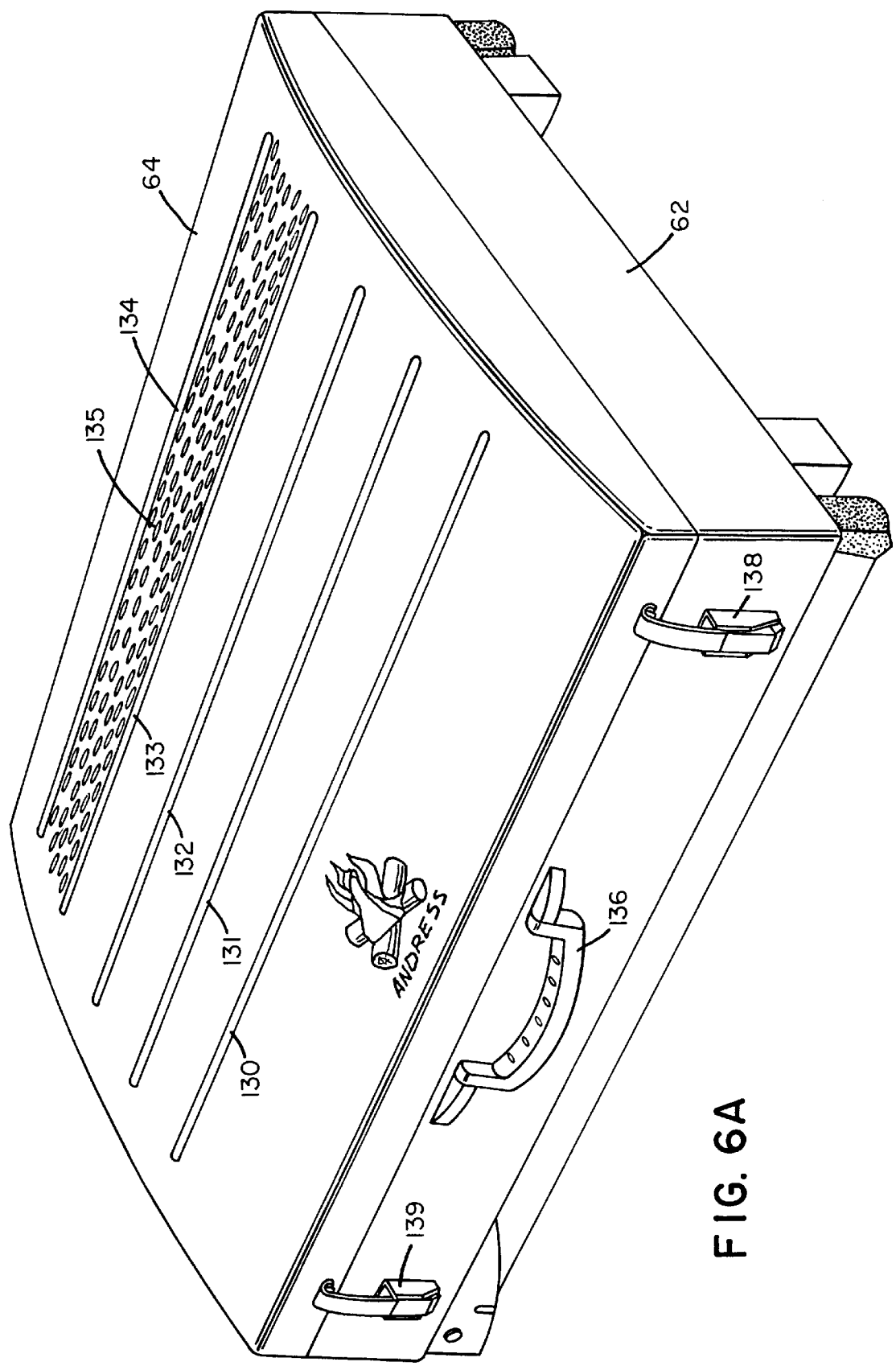
FIG. 6A shows a sealed barbecue housing of sheet metal construction according to an aspect of the present convention.

FIG. 6A is a perspective view of the sheet metal constructed barbecue grill showing a mating relationship between the upper and lower housings 62 and 64. Also shown are stiffening ribs 130, 131, 132, 133 and 134, which may be die-stamped into the upper lid housing 64 of the barbecue grill. A series of air vents may also be provided in the top portion to assist in cooling. A handle 136 and locking mechanisms 138 and 139 are also provided. FIG. 6B illustrates possible construction details of the upper lid portion 64 of the barbecue grill wherein a die-stamped side member 140 may be attached by welding or other fastening to a generally con-caved structure 64. FIG. 6C depicts fastening by conventional spot welding of sheet metal portions of the upper portion 64 and side flange 140. FIGS. 6D and 6E depict an alternative hinging mechanism between a side wall 68 and upper portion 64 of the barbecue grill.

Figure 7A:
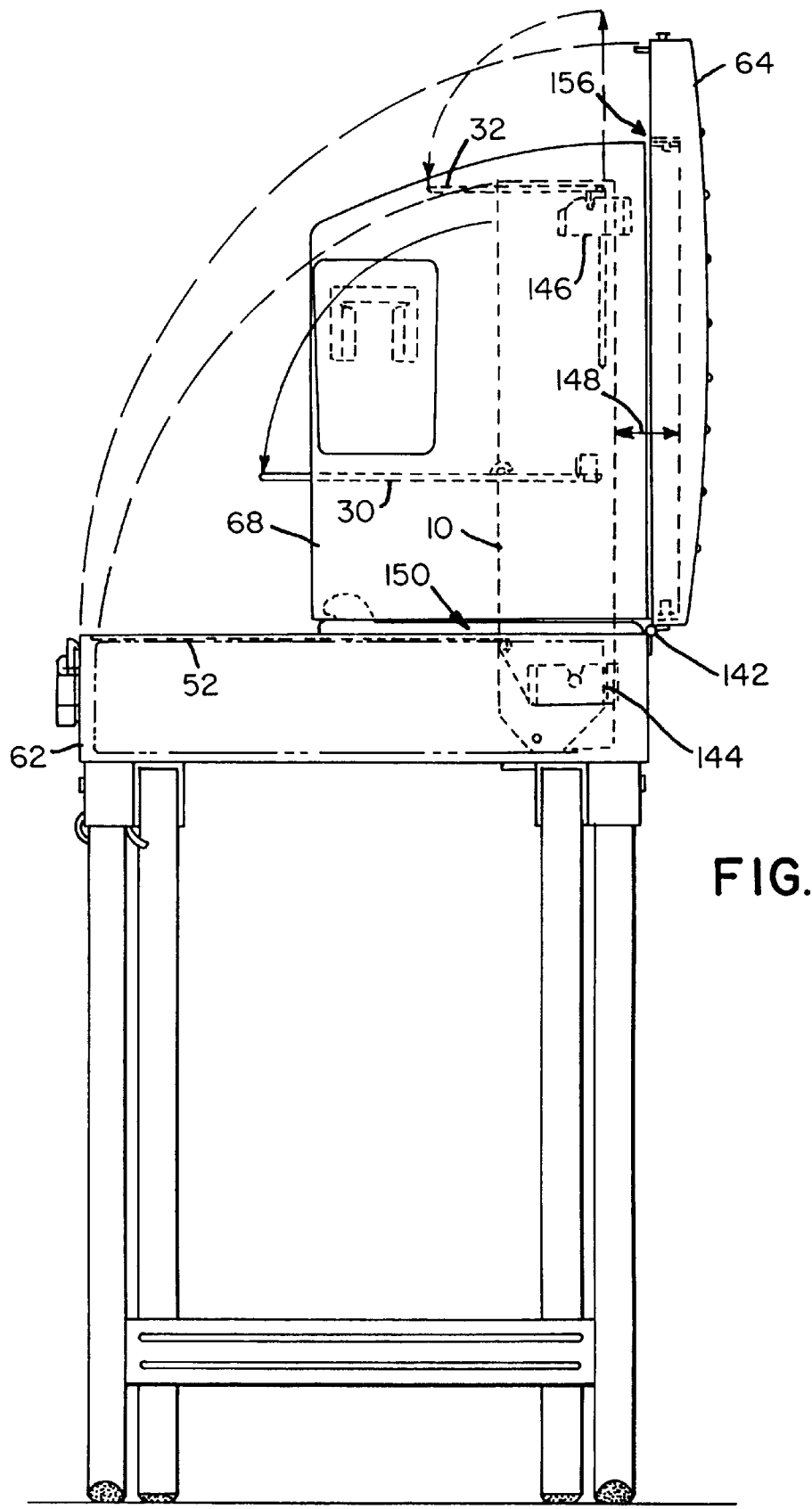
FIG. 7A depicts a side view of the sheet metal version of a barbecue grill including a removable firebox according to one aspect of the present invention.
Figure 7B:
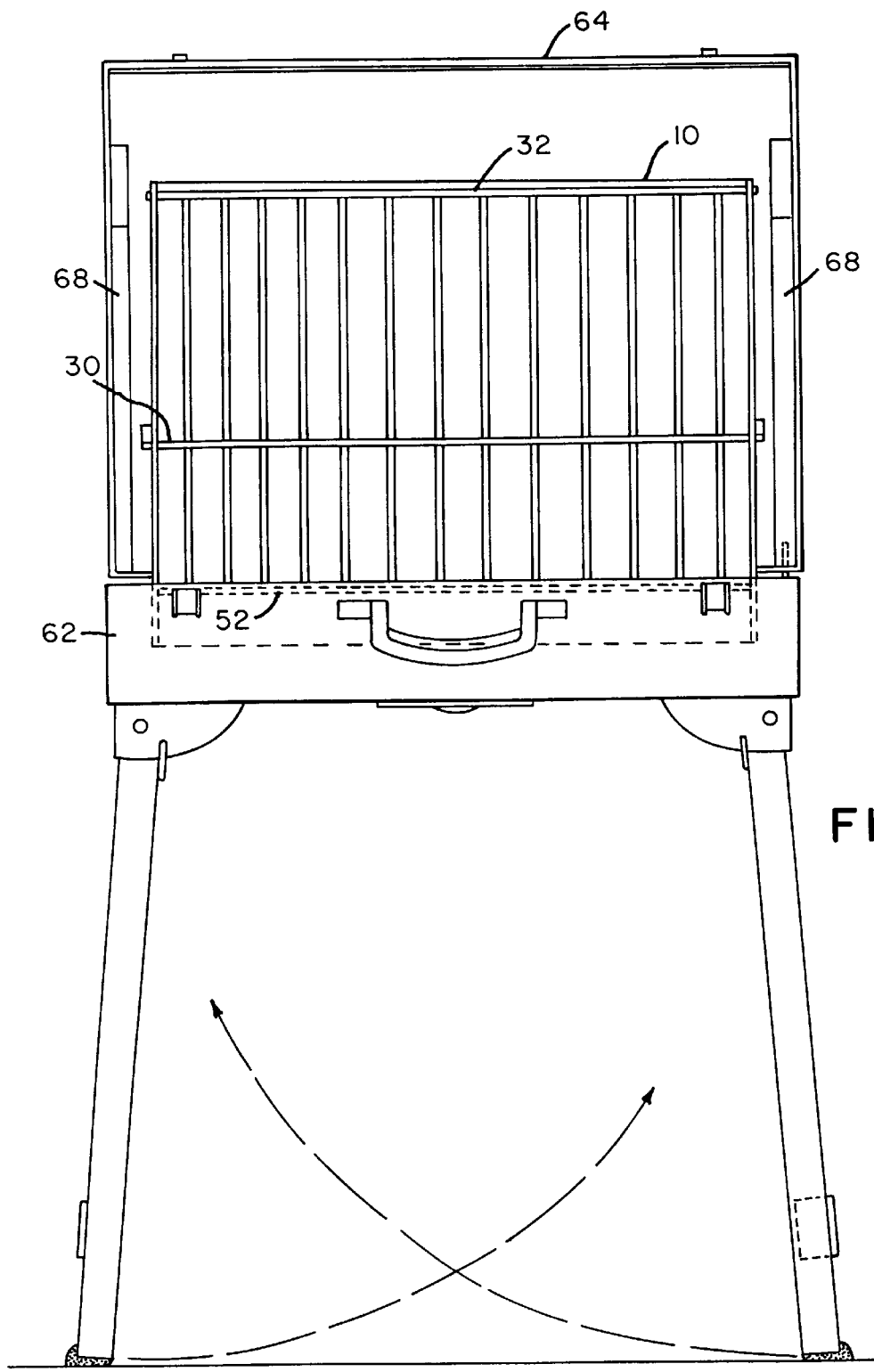
FIG. 7B is a front view of the barbecue grill of FIG. 7A.

FIGS. 7A and 7B show a side view of the barbecue grill made according to a sheet metal design. As indicated earlier, the major component to the barbecue grill may also be cast using aluminum metal. Sand or shell casting is preferred using high temperature aluminum alloys selected from the group called AL 380, AL 356 and AL 142. Other metals or alloys may also be used. According to another illustrative design, a top portion 64 is hinged to bottom portion 62 by piano hinge 142. Parts of the grill housing may be cast iron to provide heat durability.

Firebox 10 is supported by a pivot support plate 144 that is fastened to a wall within base portion 62. Pivot support plate 144 is positioned to allow the firebox to rotate downwardly into the base portion 62 to a stowed position, and to permit a portion of the firebox 10 to extend below a main grill 52 when deployed vertically. Instead of pivoting, the firebox may rest in a receptacle or cradle comprising stops, tabs, flanges, etc. fixedly attached within the cavity 60 of base 62. Importantly, the firebox 10 should extend below the main grill 52 so as to provide radiant and convective heat to a larger area underneath grill 52.

Also shown is a buffering space 148 between the rear of the firebox 10 and grill housing 64. This helps to reduce heat transfer to the outer lid housing 64 during fuel oxidation. Housing 64 may also have a double wall construction with internal insulation, similar to an oven door, in order to shield the outer wall of the housing 64 from heat. Side walls 68 may have a similar construction. Furthermore, gaps 150 and 152 provide airflow openings to sustain an air draft for oxidizing fuel in the firebox. Such venting may also exist along the area of piano hinge 142 or within portions of the upper and lower housings 62 and 64 spanning firebox 10. Airflow through and/or about the rear and side portions of the barbecue grill may be received by corresponding air vents in the side and rear of the firebox 10, which reduces the amount of any downward draft through the main grill 52, to oxidize fuel. Such downdrafts tends to cool the heating chamber thereby reducing cooking temperatures.

Side walls 68 include a flange assembly 146 having protruding ends that mate with tab 148 (FIG. 1C) in order to hold the firebox 10 in a vertical position when deployed. The grill housing of the sheet metal embodiment of the invention is preferably power coated with baked enamel. Sheet metal of about 18 gage is believed to be satisfactory for housing construction, and where strength is required, plates may be added or stiffening ribs may be stamped therein. To reduce overall weight without reducing overall dimensions of the grill, a thinner metal, i.e., 20 gage sheet metal, and stiffening ribs may be used. A basic unit of the barbecue grill measures approximately 18" by 24" by 8" but these dimensions may vary. The aluminum shell or sand casted models will have a wall thickness between approximately one-eight to one-quarter inches. Larger units of both the sheet metal and casted versions may include wheels attached to at least one pair of folding legs so that, when collapsed, the unit may be transported in a manner similar to a luggage cart. A smaller tabletop unit need not have legs, but may include insulating table mounts on the underside to shield heat. A drip pan (not shown), such as a disposable aluminum pan, may be used in the base cavity to catch grease and/or ash drippings.

FIGS. 8A, 8B and 8C are conceptual renditions of a barbecue grill assembly for receiving and supporting a removable firebox. FIG. 8A illustrates an arrangement of tabs, stops and flanges within the base cavity 60 of the lower portion 62 of the barbecue grill. FIG. 8B shows an enclosure design provided by the barbecue grill. FIG. 8C is a conceptual rendition of a removable firebox having deployed grate and cooking grill members.

The above illustrative embodiments of the invention defined by the appended claim, and the written description and drawings are not intended to limit the subject matter of the invention. According to the teachings hereof, materials may be substituted, shapes may be altered, and the construction of grill parts may be changed without departing from the general nature and character of the invention. For example, instead of hinging and/or pivoting, any of the components mentioned above may be releasably or permanently fastened together. Rather than have a rectangular cross-sectional shape, the firebox may take on a variety of other forms, including circular, elliptical, oval, etc. The invention may be used with lava rocks and include a gas source, as described in commonly-owned related U.S. Pat. No. 5,823,174 and U.S. application Ser. No. 09/190118, incorporated herein, in which case a burner would be added, or the invention may be used simply with charcoal, briquettes, wood chips and the like.

The appended claims are to be given their broadest reasonable interpretation within the limits of the prior art, and no part of the foregoing description should be viewed as limiting their construction. Unless expressly restricted by definition in the written description of the invention, words used in the appended claims are to be given their ordinary meaning.

We claim:

1. A removable firebox having a retractable heating grate and a retractable cooking grill for providing heat to a cooking area formed by a base cavity and extended side walls of a collapsible barbecue grill, said barbecue grill also having a top cavity that mates with said bottom cavity and said bottom cavity is constructed to carry said firebox during stowing, said firebox comprising:

a generally vertically disposed container for holding a source of fuel, said container having an open top and a lower confine defining a bottom, opposed confines defining front and rear segments, and opposed confines defining side segments, said front segment being constructed to permit radiation of heat from said source of fuel, said firebox including supports for pivotally supporting a mid-level cooking grill between retracted and extended positions and for supporting said mid-level cooking grill in a generally horizontal position between the top and bottom of said firebox, and said firebox further including supports for engaging and supporting a heating grate, which supports a pot or kettle directly over said source of fuel.

2. A firebox having at least one deployable cooking grill and for heating a cooking area defined by a base cavity and extended side walls of a barbecue grill, said firebox comprising:

a generally vertically disposed enclosure having an open top, a bottom confine, opposed front and rear confines, and opposed side confines for holding a source of fuel, said front confine being constructed to permit radiation of heat from said source of fuel, and supports for engaging a mid-level cooking grill between collapsed and deployed positions and for supporting said mid-level cooking grill in a generally horizontal position between the top and bottom of said firebox.

3. The firebox as recited in claim 2, wherein said firebox further includes a heating grate that supports a pot or kettle directly over said source of fuel.

4. The firebox as recited in claim 2, wherein said opposed side confines pivotally engage a member of said mid-level cooking grill and include stops for supporting said mid-level cooking grill in a generally horizontal position.

5. The firebox as recited in claim 4, wherein said mid-level grill comprises a rod that pivotally engages generally circular orifices of respective sheet metal extensions of said opposed side confines.

6. The firebox as recited in claim 4, wherein said mid-level cooking grill includes extended arms that engage protruding stops of said side confines of said firebox.

7. The firebox as recited in claim 4, wherein said mid-level cooking grill pivotally engages an axial member of said firebox.

8. The firebox as recited in claim 7, wherein said axial member comprises a rod of said front confine.

9. The firebox as recited in claim 1, wherein at least one of lower and rear portions thereof includes air vents.

10. The firebox as recited in claim 2, wherein at least one of lower and rear portions thereof includes air vents.

11. The firebox as recited in claim 2, wherein each of said opposed side confines includes a main stud for pivotally supporting said firebox on pivot supports in said base cavity.

12. The firebox as recited in claim 1, wherein said side segments include extensions for rotatably receiving extensions of said heating grate so as to permit said heating grate to fold over onto said firebox when stowed and to fold over said open top in a generally horizontal position of said firebox when deployed.

13. The firebox as recited in claim 3, wherein the width of said heating grate is less than the inside width of said firebox and said side confines include slots for slidably receiving extension arms of said heating grate so as to permit retraction of said heating grate inside said firebox when stowed.

14. The firebox as recited in claim 1, wherein at least a portion of said front segment comprises at least one of a wire mesh, expanded metal, metallic rods, perforated metal, and the like and wherein at least a portion of said other segments of said firebox comprise at least one of sheet metal, wire mesh, expanded metal, metallic rods, perforated metal and the like.

15. The firebox as recited in claim 2, wherein at least a portion of said front confine comprises at least one of a wire mesh, expanded metal, metallic rods, perforated metal and the like, and wherein at least a portion of said other confines of said firebox comprises at least one of sheet metal, a wire mesh, expanded metal, metallic rods, perforated metal and the like.

16. The firebox as recited in claim 1, further including a main cooking grill supported near a lower portion of said firebox so that, when positioned in the base cavity of said barbecue grill, said main cooking may be moved to a horizontal position above the lowermost portion of said firebox so as to permit sufficient convention and radiance of heat from said source of fuel into said heating area beneath said main cooking grill.

17. The firebox as recited in claim 2, further including a main cooking grill supported near a lower portion of said firebox so that, when positioned in the lower cavity of said barbecue grill, said main cooking may be moved to a horizontal position above the lowermost portion of said firebox so as to permit sufficient convention and radiance of heat from said source of fuel into said heating area beneath said deployed main cooking grill.

18. In combination, a deployable barbecue grill having top lid portion, a base cavity that mates with said top lid portion, and a cooking area defined by said base cavity and extended side walls upon deployment of said barbecue grill, a firebox having at least one extendable cooking grill and for heating a cooking area generally defined by said base cavity of said barbecue grill, said firebox comprising a generally vertical enclosure having an open top, a bottom confine, opposed front and rear confines, and opposed side confines for holding a source of fuel, said front confine permitting radiation of heat from said source of fuel, and supports for engaging a mid-level cooking grill between retracted and extended positions and for supporting said mid-level cooking grill in a generally horizontal position between the top and bottom of said firebox, and said base cavity of barbecue grill includes a receptacle for holding said firebox in a generally upright position near the rear portion of said base cavity.

19. The combination as recited in claim 18, wherein said barbecue grill is constructed to permit air venting to said firebox from at least one of side and rear portion of said barbecue grill and said receptacle of said base cavity permits a sufficient portion of said firebox to extend below a main cooking grill to permit convection and radiance of heat from said firebox underneath a main grill disposed about said base cavity.

20. The combination as recited in claim 18, wherein said receptacle of said base cavity is defined by at least one of stops, flanges, pins, studs, tabs, and the like that are fixedly positioned in said base cavity.

21. The combination as recited in claim 18, wherein said barbecue grill further includes hinged legs that fold into substantially the same plane, said legs being locked into an extended position when unfolded.

22. The combination as recited in claim 21, wherein said legs comprise two pairs of legs, each pair of legs including a substantially flat cross-member located on one of complementary sides of said pairs so as to permit retraction of both pairs of legs into substantially the same plane.

23. The combination as recited in claim 21, wherein the underside of the bottom cavity includes angled stops for receiving a mating surface of said legs for holding said legs in a fixed extended position.

24. The combination as recited in claim 18, wherein said top lid portion of said barbecue grill comprises an arched cavity when deployed, and is fixedly positioned and displaced from said firebox in a substantially vertical position whereby to protect users from extreme heat of said firebox.

25. The combination as recited in claim 24 wherein the surface of said arched cavity further includes stiffening ribs whereby to reduce warping tendencies of said top portion when exposed to extreme heat.

26. The combination as recited in claim 18, wherein said top portion and said bottom cavity of said barbecue grill are formed from a casted aluminum alloy and mate in sealing relation when folded upon each other.

27. The combination as recited in claim 26, wherein said aluminum alloy is selected from a group comprising AL380, AL356 and AL142.

28. The combination as recited in claim 18, wherein said top lid portion and said bottom cavity are formed of sheet metal and mate in sealing relation when folded upon each other.

29. The combination as recited in claim 18, wherein said barbecue grill further includes side walls extending upwardly from said bottom cavity to generally define, along with said top portion and bottom cavity, a cooking chamber between said side walls.

30. The combination as recited in claim 29, wherein said side wall includes rotisserie supports.

31. The combination as recited in claim 30, wherein said rotisserie supports include at least one rod journal located in said side walls for supporting a rotisserie rod.

32. The combination as recited in claim 29, wherein said rotisserie support comprises at least one rod journal located in one side wall and at least one complementary slot in said other side wall, each rod journal and slot pair being positioned a fixed distance from the generally vertical plane of said firebox above a mid-level cooking grill.

33. The combination as recited in claim 29, wherein at least one side wall includes a mechanical coil spring motor for turning a rotisserie rod.

34. The combination as recited in claim 18, wherein said top portion further includes an arcuate extendible lid which protrudes outwardly over said cooking area to form a smoker enclosure.

35. The combination as recited in claim 18, further including bifurcated extendible lid portions that are retractable within said top portion and bottom cavity and that may be extended to enclose at least a portion of said cooking area to form a smoker chamber.

36. A barbecue grill having top portion, a base cavity that mates with said top portion, and a cooking area generally defined within and about said base cavity, a firebox having an extendable cooking grill and for providing heat to said cooking area, said firebox comprising a generally vertical enclosure for holding a source of fuel and having an open top, a bottom confine, opposed front and rear confines, and opposed side confines, wherein said front confine is substantially planar and permits radiation of heat from said source of fuel, said base cavity of barbecue grill including a receptacle for supporting said firebox in a generally vertical position near a rear portion of said base cavity, said receptacle being constructed to permit a sufficient portion of said firebox to extend below a main cooking grill disposed about said base cavity in order to permit convection and radiance of heat from said firebox underneath said main grill, a pair of side walls pivotably supported by at least one of said top portion and said bottom cavity, said side walls extending upwardly from said base cavity when deployed thereby to further define said cooking area, said side walls including at least one rotisserie rod support, and at least one of said firebox and said pair of side walls including supports for supporting said mid-level cooking grill in a generally horizontal position between the top and bottom confine of said firebox.

37. The barbecue grill as recited in claim 36, further including a kettle rack arranged to support a pot directly above a source of fuel in said firebox.

38. The barbecue grill as recited in claim 36, further including dual pairs of leg assemblies that fold substantially into substantially the same plane in a stowed position.

39. The barbecue grill as recited in claim 36, wherein housing portions said top portion and base cavity are constructed to provide venting of air to burning fuel in said firebox from at least one of rear, bottom and sides of said housing portions.

40. The barbecue grill as recited in claim 36, wherein at least one of said side walls and said top lid further includes a radiant reflective surface to help confine heat within said cooking area.

41. The barbecue grill as recited in claim 36, wherein said top portion of said barbecue grill has a double wall construction and includes insulation material between said double walls.

* * * * *